UNITED STATES PATENT OFFICE.

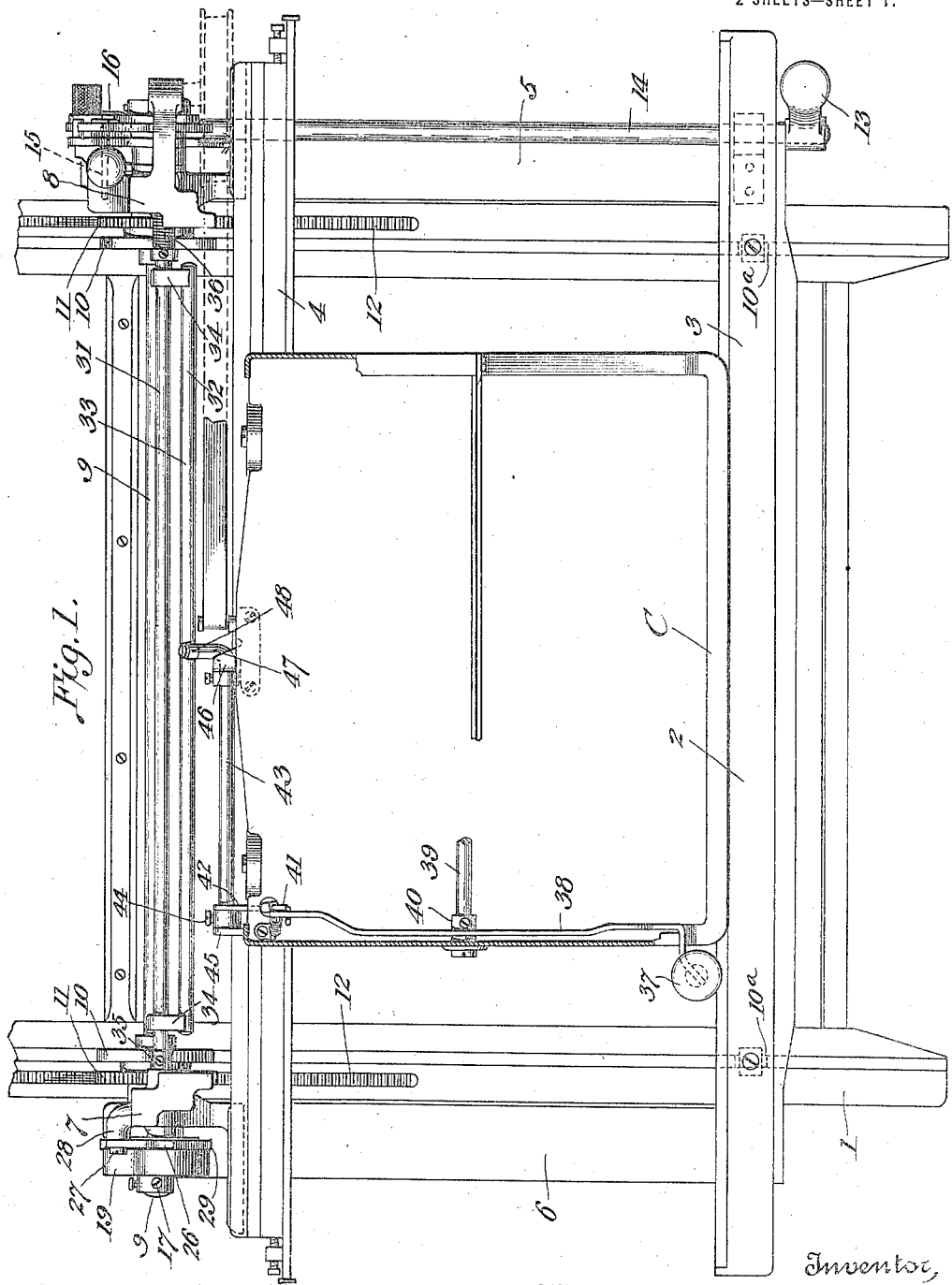

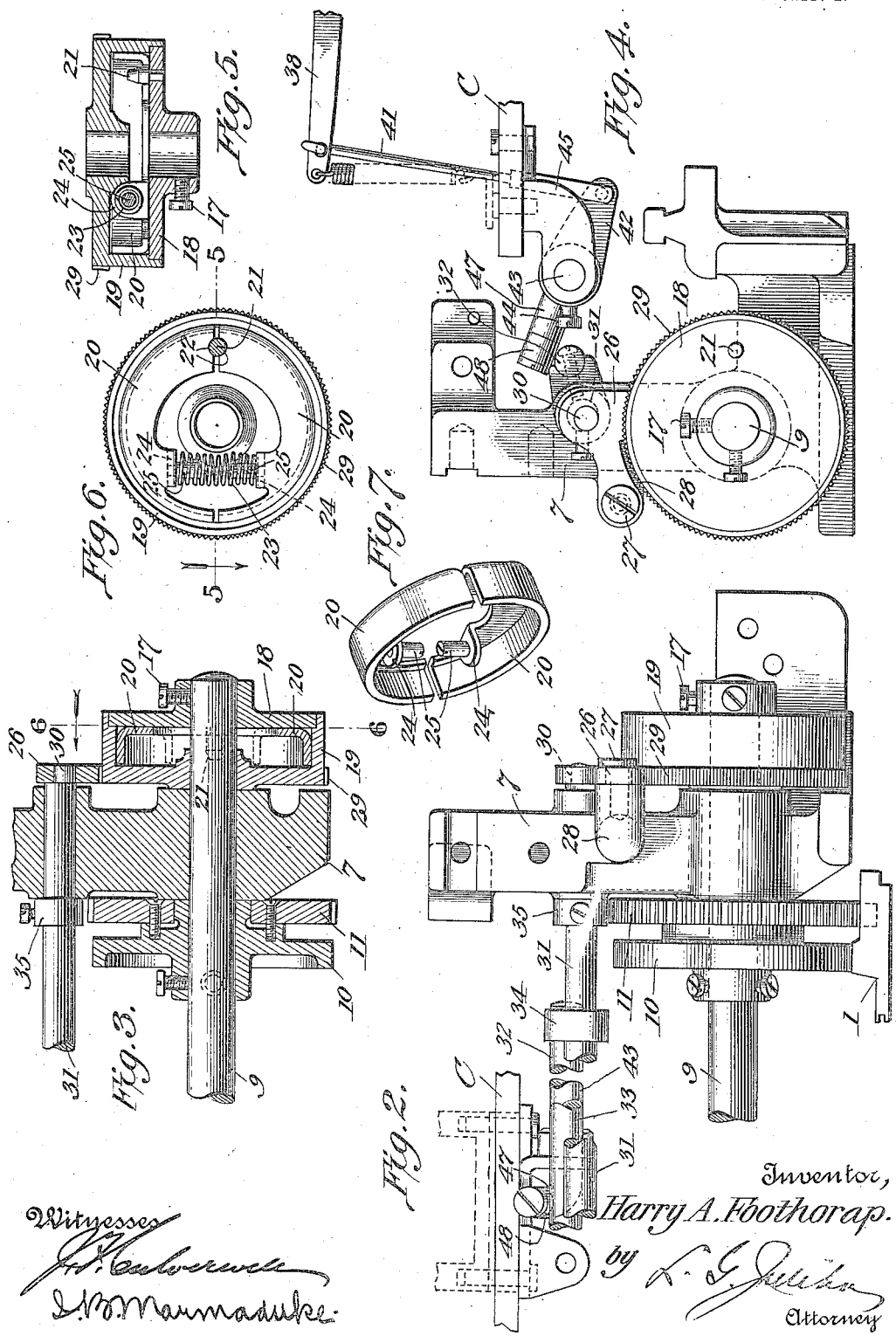

HARRY ARTHUR FOOTHORAP, OF HARRISBURG, PENNSYLVANIA, ASSIGNOR TO ELLIOTT-FISHER COMPANY, OF HARRISBURG, PENNSYLVANIA, A CORPORATION OF DELAWARE.

LINE-SPACE LOCK AND RELEASE.

1,236,420.          Specification of Letters Patent.     Patented Aug. 14, 1917.

Application filed December 14, 1914. Serial No. 877,215.

*To all whom it may concern:*

Be it known that I, HARRY ARTHUR FOOTHORAP, a citizen of the United States of America, residing at Harrisburg, in the county of Dauphin and State of Pennsylvania, have invented certain new and useful Improvements in Line-Space Locks and Releases, of which the following is a specification.

This invention relates to typewriting machines and more particularly to a line space brake and controlling means therefor.

The object of the invention is to provide that element of the typewriter which is moved for line spacing, with a brake which, when in action, resists the tendency of the line space element to overrun and hold said element securely in position during the writing operation, but which may be rendered ineffective so as to leave the line space element unretarded and free to be moved easily and quickly any distance desired.

In the accompanying drawings:—

Figure 1 is a plan view of so much of an Elliott-Fisher billing machine or flat platen typewriter as is necessary to illustrate the application of my invention.

Fig. 2 is a rear elevation of the line space brake and associated parts.

Fig. 3 is a vertical sectional view of the structure shown in Fig. 2.

Fig. 4 is a side elevation of the brake and most of the controlling mechanism.

Fig. 5 is a sectional view of the brake drum showing the shoe carrier and one of the shoes.

Fig. 6 is an elevation of the brake with the shoe carrier removed, and

Fig. 7 is a perspective view of the two brake shoes.

In the type of machine with which this invention is more particularly concerned, the work sheets or elements are sustained by a flat platen associated with which is a track frame indicated by 1 in Fig. 1. Upon this track frame is supported to move freely, longitudinally of the platen, the main machine frame or line space frame 2 comprising front and rear bars 3 and 4 and side or end bars 5 and 6. The several frame bars are united to form an open oblong frame at the rear corners of which are fixed the two combination brackets 7 and 8 which serve to support a number of the adjunctive mechanisms of the typewriter including the major portion of the mechanism with which we are concerned. Extending parallel to the rear frame bar 4 and afforded bearings in the brackets 7 and 8 is a line space shaft 9 upon which are fixed the rear rollers 10 of the line space frame 2 and the two line space pinions 11. The rollers 10 serve in conjunction with the front rollers 10ª to support the line space frame for free, substantially anti-frictional movement on the track frame whereas the pinions 11 engage toothed racks 12 set into the side members of the track frame so that when the shaft 9 is rotated by the line spacing mechanism, the line space frame will be moved with certainty and accuracy the distance of the line space interval.

We are not concerned with the line space mechanism except as it may enter into combination with the line space brake and the controlling elements of the latter. The line space mechanism, here shown, is described and claimed in my accompanying application for Letters Patent, No. 877,214. Suffice it to say that the line spacing mechanism includes a line space handle or key 13 located at the front right hand corner of the line space frame and connected through intermediate mechanism including a rock shaft 14 with a driving arm 15 which is oscillated by the key 13 to impart a partial rotary movement to the shaft 9 to effect line spacing movement of the frame 2. As is common with line spacing mechanisms, the driving elements thereof, except when in operation, are independent of the line space element, in this case the shaft 9, so that in the normal position of the line space handle or key 13, the driving elements of the line spacing mechanism are independent of the line space shaft and oppose no obstruction to the movement thereof. For convenience, in referring to the line spacing mechanism, the same is indicated generally by 16.

We come now to a description of the mechanism which is the primary subject-matter of this application. It may be well to state, however, by way of premise, that the proper control of the line space frame in its movement on the track frame has long been one of the vexatious problems in connection with typewriters of the flat platen class. This is for the reason that, while it is desirable to have the line space frame move freely and lightly both in its line space advance and in its more extensive movement back and forth over the platen, it is absolutely necessary that when once positioned the frame shall be securely held against accidental displacement because otherwise it would be impossible to produce a properly printed record. Indeed the necessity for this rigid positioning of the line space frame and the printing mechanism mounted thereon has been so manifest and controlling that the only machines now marketed, except the one here shown, forego the advantages of a light running roller mounting for the line space frame, in order to make use of the friction between the frame and its support to hold the machine rigid after it is once positioned. I am advised that attempts have been made to render possible the use of roller bearings for the line space frame by providing a positive lock for the frame, the lock being in the form of a toothed locking dog arranged to engage a stationary rack. This arrangement, however, is open to two very serious objections, first, that if, in the rapid manipulation of the machine, the lock is prematurely released through the rapid movement of the frame, the momentum of the latter will rip out the teeth of the rack or mutilate some other element of the lock. Another objection is that the teeth of the rack must be of substantial dimensions to serve their purpose under these conditions of sudden positive locking and for this reason the locking of the frame cannot be made universal but can only take place when the frame is in position to present the locking elements in proper position to engage each other.

I will now proceed to describe a mechanism whereby a roller mounted, freely movable line space carriage may be securely and accurately held when once positioned by holding or retarding means operative universally at any point in the movement of the frame and including an organization of elements which, while constituting an efficient line space lock under all proper conditions, will yield when subjected to undue strain and thus avoid the possibility of breakage when the lock or brake is thrown into action during rapid movement of the frame or subjected to any other of the many abuses of operation in the hands of unskilled operators.

To the end of the shaft 9 adjacent to the bracket 7 is fixed, as by a set screw 17, a shoe carrier 18 which closes the outer open side of a brake drum 19 loosely mounted on the shaft 9 to permit independent rotation thereof. Within the brake drum 19 are housed two substantially semi-circular brake shoes 20 conforming to the internal curvature of the drum 19 and adapted to have slight swinging motion from a fulcrum pin 21 extended into the brake drum from the shoe carrier 18 at one side of the axis thereof and engaging notches 22 in the opposed end faces of the shoes. The shoes 20 are urged apart and into engagement with the drum 19 by a spring 23 interposed between a pair of flanges 24 bent back from the bottom walls of the respective shoes and having studs 25 which extend into and serve to hold and guide the spring 23. The spring 23 urges the shoes 20 apart and into frictional engagement with the rim of the drum 19. This frictional engagement unites the drum 19 and the shoe carrier 18 in a single organization which rotates with the shaft 9 without opposing any resistance whatever to such rotation. If, however, the drum 19 is held stationary, the frictional contact between it and the shoes 20, as the carrier and shaft 9 rotate, serves to brake or retard the movement of the shaft and in effect lock the same against such accidental movement as would dislocate the line space frame with respect to the proper printing point. Obviously, therefore, the control of the line space lock or brake may be effected by providing means for holding the brake drum 19 stationary or releasing the same to permit its rotation with the shaft 9. The controlling mechanism therefor includes a locking dog 26 mounted to swing from a fulcrum screw 27 screwed into an extension 28 of the bracket 7. The dog 26 is toothed or knurled to provide for its positive interlocking engagement with the knurled periphery 29 of the drum 19. Adjacent to its free end the dog 26 is engaged by a pin 30 extended to form an eccentric with respect to the adjacent end of the shaft 31, afforded bearings in the two brackets 7 and 8 and constituting an element of a controlling bail 32 having a bail bar 33 disposed parallel with the shaft 31 and secured thereto by arms 34. The shaft 31 is held against endwise displacement by set collars 35 between one of which and the adjacent bracket 8, the shaft is encircled by a spring 36 which tends to elevate the bail 32 so that the pin 30 will hold the locking dog 36 in engagement with the drum 19 thus rendering the lock or brake normally effective to oppose the rotation of the line space shaft 9.

The locked or effective condition of the line space lock or brake being the normal condition, it is only necessary to provide the machine with a line space lock release which may be manipulated by the operator to render the line space brake ineffective when it is desired to move the line space frame freely back and forth on the track frame. The primary element of the line space lock releasing mechanism is a line space lock release key 37 located at the front left hand corner of the carriage C which, as already stated, travels on the line space frame 2 and carries the printing mechanism, not shown.

The release key 37 is carried by the front end of a line space release lever 38 fulcrumed on a stationary shaft or rod 39 which extends across the carriage and has a set collar 40 to retain the lever 38 in place adjacent to one side or end wall of the carriage C. From the rear end of the lever 38 is dropped a link 41 attached at its lower end to an arm 42, adjustably fixed to a rock shaft 43 as by a set screw 44. The shaft 43 is afforded bearings in brackets 45 and 46. The shaft 43 terminates practically midway of the carriage and has a bail depressing arm 47 arranged to depress the bail 32 and preferably equipped with a roller 48 to reduce the friction between the arm 47 and the bail 32. The length of the bail 32 is such that at all times, regardless of the position of the carriage on the frame 2, the bail depressing arm 47 of the line space release mechanism will be in coöperative relation with the bail. Therefore, the depression of the line space release key 37 at any time will rock the shaft 43 and depress the bail 42 to lift the locking dog 26 and thus release the brake drum 19 so that the latter will rotate with instead of opposing resistance to the line space shaft 9.

Normally the line space frame 2 is locked on its support and is held rigidly in place during the printing operation because the line space shaft 9 is geared to the track frame by the line space gears 11 and is held against rotation by the brake shoes 20 mounted to move with the shaft 9 and gripping the drum 19 held stationary by the dog 26. There is, therefore, no danger of any accidental movement or creeping of the line space frame during the printing operation, notwithstanding the fact that there is a practical frictionless bearing between the line space frame and the track frame afforded by the front and rear supporting rollers 10ª and 10 of the machine.

When it is desired to line space the machine, it is simply necessary to depress the line space key or handle 13 when, as usual in the art, the line space shaft 9 will be given a partial rotation. If desired, the line space release key 37 may be depressed so as to render the line space lock or brake ineffective during the line space operation. That, however, is not the contemplated mode of operation, since it is preferable to have the operation of the line spacing operation resisted by the line space brake. This is for the reason that in the spacing of a light running frame, such as that here shown, there will perhaps be a tendency to overrun, which tendency is not manifest when the line spacing operation is opposed by the brake. The operation of the line spacing mechanism is not rendered laborious by the resistance opposed thereto by the brake. In fact, the resistance opposed to the operation of the line spacing mechanism by the roller mounted frame, here shown, plus the friction of the line space brake is materially less than the resistance opposed to the line spacing mechanism by the usual sliding line space frame of this class of machine.

If however, it is desired to move the machine freely back and forth on the track frame, the operator depresses the line space release key 37 which, in the manner heretofore described, renders the line space brake ineffective and permits the light running frame 2 to be moved rapidly back and forth over the platen. Should the operator release the key 37 while the frame 2 is in rapid motion, the lock or brake will be thrown into action but no breakage or derangement of the parts can result because, before a breaking strain is brought to bear upon any element of the mechanism, the brake shoes 20 will rotate within the drum 19 and thus apply a yielding resistance to the rotation of the shaft 9 until the frame is brought to rest.

It is thought that from the foregoing the construction and operation of my line space locking or breaking mechanism and the manner of its combination with the line space frame and the line spacing mechanism will be fully understood but I reserve the right to effect such variations of the illustrated structure as may come fairly within the scope of the protection prayed.

What I claim is:—

1. The combination with a support and a line space frame movable thereon, of line spacing mechanism and a line space brake both movable with the frame, a carriage movable on the frame, and brake controlling means mounted in part on the carriage.

2. The combination with a support and a line space frame movable thereon, of line spacing mechanism, a line space brake, a carriage movable on the line space frame, and brake controlling means carried in part by and operative in any position of the carriage.

3. The combination with a support and a line space frame, of a carriage movable on the frame, a brake yieldingly opposing the movement of the frame, and brake controlling means including a key mounted on and movable with the carriage.

4. The combination with a support and a line space frame, of a brake yieldingly opposing the movement of the frame, a carriage mounted on the frame, a key movable with the carriage, and connections between the key and the brake whereby the brake may be controlled by the manipulation of the key in any position of the carriage on the frame.

5. The combination with a line space frame, of a brake yieldingly opposing the movement thereof, a carriage movable on the frame, and controlling means for the brake, said controlling means including an element disposed parallel with the carriage travel, and an operating device mounted on the carriage and coöperatively related to said element in all positions of the carriage.

6. The combination with a support, a line space frame movable thereon and a carriage movable on the line space frame, of line spacing mechanism for advancing the line space frame on its support, a line space brake normally opposing yielding resistance to the movement of the line space frame, brake controlling means, said controlling means including a bail carried by the line space frame, and a bail operating device mounted on the carriage and movable along the bail to maintain a coöperative relation therewith in all positions of the carriage on the frame.

7. The combination with a line space frame, of a support, a rotary line space member movable with the frame and coacting with the support, a brake drum, a brake shoe arranged to effect a frictional engagement between the rotary line space element and the brake drum, and means for holding the brake drum stationary to retard the rotary line space element and operative to release the drum.

8. The combination with a line space frame, of a line space shaft, a shoe carrier movable with the shaft, brake shoes mounted on the carrier, a brake drum engaged by the shoes, and a locking dog movable into and out of locking relation with the brake drum.

9. The combination with a line space frame, of a line space shaft, a brake associated with the shaft and including a drum, a holding dog for the drum, and a key for operating the dog.

10. The combination with a line space frame and a carriage movable thereon, of a line space shaft associated with the frame, a line space brake associated with the shaft and including a brake drum, a dog movable into and out of engagement with the drum, a bail arranged to operate the dog and disposed parallel to the carriage travel, a rock shaft mounted on the carriage and operatively related to the bail in all positions of said carriage, and a key for operating the rock shaft.

11. The combination with a line space frame, of a line space brake mounted in rear thereof, a carriage movable on the frame, and controlling means for the brake, said controlling means including a key located on the carriage at the front thereof.

12. The combination with a line space frame, of a line space shaft mounted in rear thereof, line spacing mechanism and a line space brake associated with opposite ends of the line space shaft, brake controlling means including a bail disposed parallel with the line spaced shaft, a carriage mounted to travel on the line space frame, a key mounted on the carriage, and an actuating device movable along the bail with the carriage and arranged to be operated by the key to swing the bail.

13. A line space brake comprising a disk, a pair of arcuate shoes, a fulcrum pin extended from the disk and affording a fulcrum for the shoes, a spring interposed between the shoes to urge the same in opposite directions, a brake drum inclosing and engaged by the shoes, and a holding device movable into and out of engagement with the drum.

14. The combination with a line space frame and a carriage movable thereon, of a line space brake including frictionally engaging parts opposing the movement of the line space frame, means for normally holding one of said parts relatively stationary, a line space release key mounted on and movable with the carriage and means operated by said key from releasing the normally stationary part of the brake.

In testimony whereof I affix my signature in presence of two witnesses.

HARRY ARTHUR FOOTHORAP.

Witnesses:
W. J. EVERT,
EDWIN FLOYD.